United States Patent [19]
Succi et al.

[11] Patent Number: 5,556,603
[45] Date of Patent: Sep. 17, 1996

[54] PROCESS FOR THE PURIFICATION OF HYDROGEN AND A PURIFIER THEREFOR

[75] Inventors: Marco Succi, Milan, Italy; D'Arcy Lorimer, San Luis Obispo, Calif.

[73] Assignee: SAES Getters S.p.A., Italy

[21] Appl. No.: 471,638

[22] Filed: Jun. 6, 1995

Related U.S. Application Data

[62] Division of Ser. No. 386,325, Feb. 10, 1995, which is a continuation of Ser. No. 86,573, Jul. 6, 1993, abandoned, which is a continuation of Ser. No. 825,096, Jan. 24, 1992, abandoned.

[51] Int. Cl.$^6$ .......................... B01J 19/00; B01D 53/02; C01B 21/00; C01B 3/02
[52] U.S. Cl. ................. 422/213; 96/121; 96/126; 95/140; 423/235; 423/220; 423/247; 423/248; 423/648.1; 423/654
[58] Field of Search ........................ 422/211, 213, 422/216, 189, 190; 423/235, 220, 246, 247, 248, 648.1, 654; 95/115, 116, 118, 119, 130, 139, 140, 148; 96/121, 126, 130

[56] References Cited

U.S. PATENT DOCUMENTS

| | | |
|---|---|---|
| 3,185,540 | 5/1965 | Breck . |
| 3,368,329 | 2/1968 | Eguchi et al. . |
| 3,534,531 | 10/1970 | Eguchi et al. . |
| 3,789,106 | 1/1974 | Hoy . |
| 3,969,481 | 7/1976 | Murray et al. . |
| 4,216,198 | 8/1980 | Simons . |
| 4,306,887 | 12/1981 | Barosi et al. ........................ 55/65 |
| 4,312,669 | 1/1982 | Boffito et al. ...................... 75/177 |
| 4,468,235 | 8/1984 | Hill ................................... 55/16 |
| 4,579,723 | 4/1986 | Weltmer et al. ................... 423/219 |
| 4,713,224 | 12/1987 | Tamhankar et al. ............... 423/219 |
| 4,849,155 | 7/1989 | Penzhorn et al. . |
| 4,875,945 | 10/1989 | Penzhorn et al. . |
| 4,983,194 | 1/1991 | Hopkins et al. ................... 62/22 |
| 5,080,875 | 1/1992 | Bernauer . |
| 5,154,736 | 10/1992 | Mifflin ............................... 55/26 |
| 5,172,066 | 12/1992 | Succi et al. ........................ 524/693 |
| 5,180,568 | 1/1993 | Boffito et al. ..................... 75/177 |
| 5,194,233 | 3/1993 | Kitahara et al. ................... 423/210 |
| 5,294,407 | 3/1994 | Succi et al. ........................ 422/119 |

FOREIGN PATENT DOCUMENTS

| | | |
|---|---|---|
| 0240270 | 7/1987 | European Pat. Off. . |
| 51-1675 | 1/1976 | Japan . |
| 2177079 | 12/1989 | United Kingdom . |

OTHER PUBLICATIONS

George et al., "Removal of simple hydrocarbons from a rare gas by a 70% Zr–25% V–5% Fe getter," Gas Separation & Purification, vol. 3, Jun. 1989; pp. 50–55.

Albrecht et al "Application of SAES and HWT gas purifiers for the removal of impurities from helium–hydrogen gas mixtures," Journal of the less Common Metals ; 172–174, 1991; pp. 1157–1167.

Heimbach et al., "Removal of Nitrogen and Methane from Hydrogen by Metal Getters"; EURATOM pp. 421–426.

"13th Symposium of Fusion Technology " Sep. 1984, VARESE cited in the application see p. 421—p. 426.

Primary Examiner—Nina Bhat
Attorney, Agent, or Firm—Hickman Beyer & Weaver

[57] ABSTRACT

An apparatus is provided which is capable of removing impurities from an impurity-containing hydrogen gas without generating methane. A bed of particulate nickel in an amount of at least 5% by weight as elemental nickel at a temperature of from 0° C. to 50° C. removes all impurities except nitrogen. Then a bed of getter material, a zirconium, vanadium and iron alloy at a temperature of from 200° C. to 800° C. removes the nitrogen impurity thus producing purified hydrogen with an impurity content of less than 20 ppb.

7 Claims, 2 Drawing Sheets

PROCESS FOR THE PURIFICATION OF HYDROGEN AND A PURIFIER THEREFOR

This is a division of copending application Ser. No. 08/386,325 filed on Feb. 10, 1995 which is a continuation of application Ser. No 08/086,573 filed Jul. 6, 1993 now abandoned, which is a continuation of application Ser. No. 07/825,096 filed on Jan. 24, 1992 now abandoned.

BACKGROUND OF THE INVENTION

1. Field of the Invention

The invention relates to a process and a purifier for the purification of hydrogen without provoking the production of methane and more particularly to the production of purified hydrogen with less than 20 parts per billion (parts per $10^9$ by volume) of methane.

2. Description of the Prior Art

As the semiconductor industry is developing integrated circuits with ever more increasing line densities it is required that the materials used in the manufacturing processes involved be of ever increasing purity. As hydrogen is one of the gases used in these processes it is therefore necessary to ensure that its impurity content be kept as low as possible. The main impurity gases in commercial hydrogen are nitrogen, moisture (water vapour), carbon monoxide and carbon dioxide.

One method of purification of hydrogen has been to employ the known fact of the selective diffusion of hydrogen through palladium or palladium alloys. The rate of diffusion increases with the pressure difference between the opposite sides of a palladium barrier. Furthermore the operating temperature required for an economical throughput of purified hydrogen is 500° C. or above. In addition, as the impurities contained within the hydrogen are blocked by the palladium barrier some means if removal must be provided. Takashi Eguchi et al. in U.S. Pat. No. 3,368,329 provide one such apparatus. Another form of hydrogen purification by means of diffusion membranes is shown in Takashi Eguchi et al. in U.S. Pat. No. 3,534,531.

Such diffusion barriers while very efficient have several disadvantages. If the barrier is sufficiently thin to ensure a high throughput of purified hydrogen it becomes subject to mechanical failure with the undesirable leakage of impure hydrogen into the purified gas. The disadvantage is aggravated by the already high pressure difference between the two sides of the barrier. If the barrier thickness is increased to avoid mechanical failure then excessively high temperatures must be adopted to ensure a high throughput of purified gas. The use of high temperatures in the presence of hydrogen is also very dangerous due to the potential existence of explosive hydrogen-oxygen (air) mixtures whenever temperatures of 570° C. or above are encountered.

The use of various gas sorption materials in the purification of a wide variety of gases is also well known in the art. See for example United Kingdom patent application N 2,177,079 A and N 2,177,080 A wherein the purification of argon and nitrogen respectively, using two stages of purification, is discussed.

In the article "Removal of simple hydrocarbons from a rare gas by a 70% Zr—25% V—5% Fe getter" by M. A. George, J. H. Kiefer and J. P. Hessler published in Gas Separation and Purification, 1989, Vol. 3, pp. 50–55 there is described a two zone purifier which effectively removes methane from argon to less than 20 ppb. However this is for the purification of rare gases and not hydrogen.

An article with the title "Removal of nitrogen and methane from hydrogen by metal getters" by H. Heimbach, H. R. Ihle and C. H. Wu published in the Proceedings of the 13th Symposium on Fusion Technology (SOFT), Varese, Sep. 24–28, 1984, pp. 421–426 describes the removal of methane from hydrogen but found that "a measurable depletion of $CH_4$ required temperatures in excess of 500° C." and an "Appreciable depletion of $CH_4$ occurs at about 600° C." (See Abstract) when using $Zr_3Al_2$ or $Zr(V_{0.83} Fe_{0.17})_2$ as getter materials for the removal of impurities. But there is no indication of the problems which arise when there is the simultaneous removal of carbon monoxide or carbon dioxide.

In another article "Application of SAES And HWT" gas purifiers for the removal of impurities from helium-hydrogen in the Journal of less Common Metals, Vol. 172–174 (1991) pp. 1157–1167, there is described the effect of the simultaneous sorption of various impurities. At page 1165 it states "For $CH_4$ the getter temperature of 200° C. was obviously too low to cause any measurable sorption effect. At 300° C., however a surprising effect was found: an increase in concentration rather than the expected decrease. This can be explained by the formation of additional methane caused by the interaction of carbon monoxide and hydrogen during the passage through the getter". This effect is shown in FIG. 7 of the publication. It goes on to propose the use of two getter beds. "The first bed is operated in the range 200°–250° C. to reduce the concentration of CO and $H_2$ and the second at a temperature of at least 400° C. to remove effectively all the $CH_4$ and $N_2$". However when hydrogen is to be purified the hydrogen cannot be removed. As an alternative it proposes, in the conclusions to provide separation of hydrogen isotopes in molecular form by using a Pd-Ag diffused in a first purification step. This reintroduces all the disadvantages of the palladium diffusors previously discussed.

OBJECTS OF THE INVENTION

It is therefore an object of the present invention to provide an improved process for the purification of hydrogen which is free from one or more disadvantages of prior processes for the purification of hydrogen. It is another object of the invention to provide an improved process for the purification of hydrogen which does not require the use of the selective diffusion of hydrogen through palladium or palladium alloys.

It is yet another object of the present invention to provide an improved process for the purification of hydrogen which does not require the use of temperatures above 500° C.

It is a further object of the present invention to provide an improved process for the purification of hydrogen which prevents the presence of explosive hydrogen-oxygen (air) mixtures.

It is another object of the Present invention to provide an improved process for the purification of hydrogen which is free from high gas pressure differences.

It is another object of the present invention to provide an improved process for the purification of hydrogen which is free from the production of methane.

Furthermore it is an object of the present invention to provide an improved purifier which performs an improved hydrogen purification process in accordance with the present invention.

These and further advantages of the present invention will become clear to one skilled in the art by reference to the following description thereof and drawings wherein:

SUMMARY OF THE INVENTION

The invention is achieved by providing a process for the removal of impurities from an impurity-containing hydrogen gas, without generating the production of methane, said impurities consisting of at least one first impurity gas chosen from the group consisting of carbon monoxide and carbon dioxide, and a second impurity gas consisting essentially of nitrogen. It comprises the steps of passing the impurity-containing hydrogen gas through an impurity-containing hydrogen gas inlet in fluid communication with a first hydrogen gas purification chamber. Then contacting the impurity-containing hydrogen gas with a bed of particulate material contained within said first hydrogen gas purification chamber. The bed of particulate material is comprised of nickel in an amount of at least 5% by weight as elemental nickel at a temperature of from 0° C. to 50° C. to remove the at least one first impurity gas, thus producing partially purified hydrogen gas containing only the second impurity gas consisting essentially of nitrogen. The first hydrogen gas purification chamber is coupled with a second hydrogen gas purification chamber. Then the partially purified hydrogen gas is contacted with a bed of getter material in the second hydrogen gas purification chamber at a temperature of from 200° C. to 500° C. to remove nitrogen thus producing purified hydrogen gas with an impurity content of less than 20 ppb. The second hydrogen gas purification chamber is in fluid communication with a purified hydrogen gas outlet through which outlet the purified hydrogen gas is passed.

DETAILED DESCRIPTION OF THE INVENTION

Figure 1:
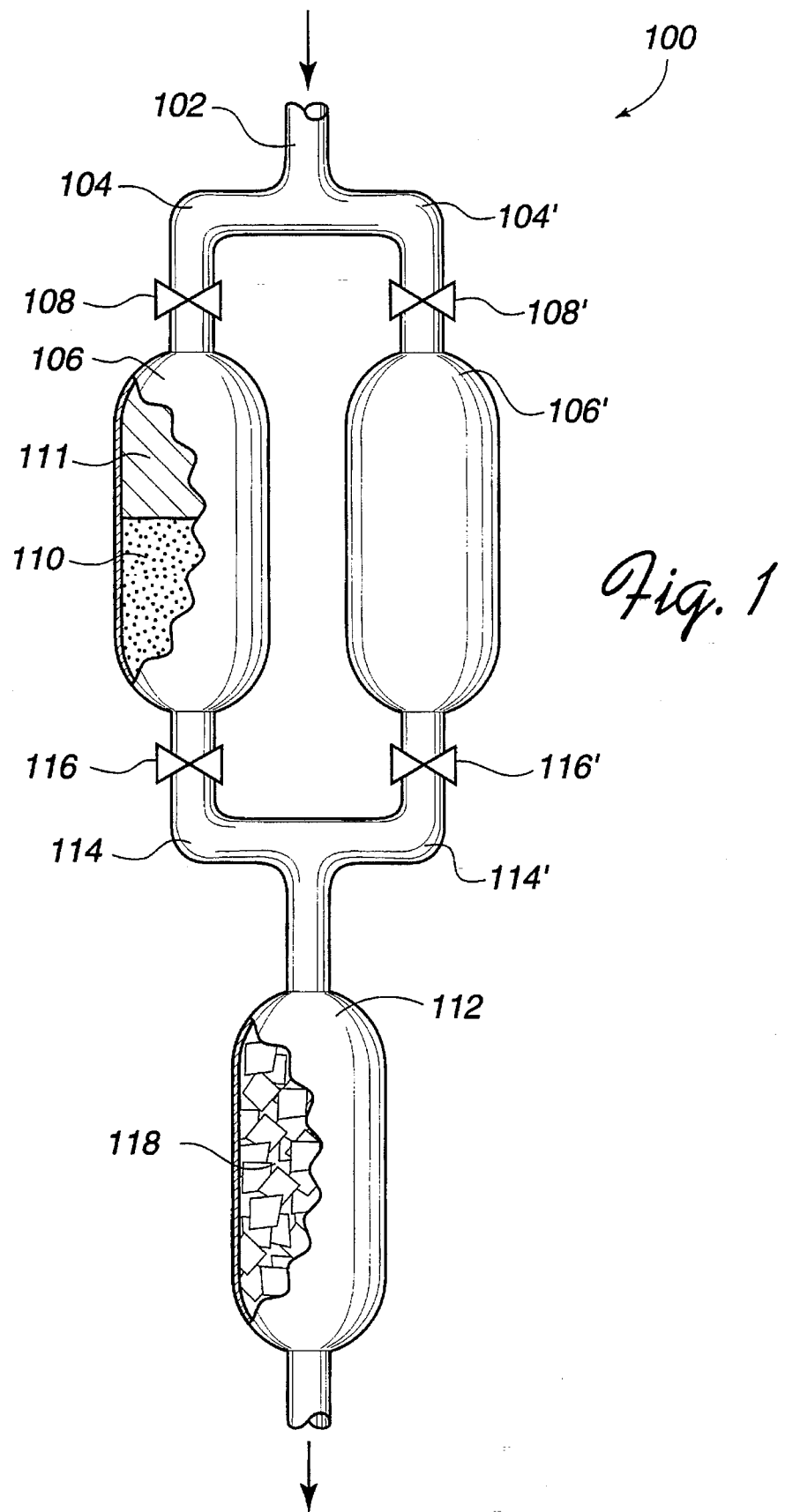
FIG. 1 is a partially cut-away representation of a purifier of the present invention suitable for the removal of impurities from an impurity containing hydrogen gas.

Referring now to the drawing of FIG. 1 there is shown a purifier 100 for the removal of impurities from an impurity-containing hydrogen gas, without generating the production of methane. In commercially available hydrogen the impurities consist of at least one first impurity gas, usually carbon monoxide, and/or carbon dioxide, and a second impurity gas consisting essentially of nitrogen. Moisture (water vapour) may also be present. These impurity gases are usually present in decreasing order of magnitude as nitrogen, moisture, carbon monoxide and carbon dioxide. The total impurity content being about 20 ppm (part per million or parts per $10^6$ by volume) or less.

Purifier 100 has an impurity-containing hydrogen gas inlet 102 which may be in fluid communication through tubulations 104, 104' with a first hydrogen gas purification chamber 106, 106'. Valves 108, 108' can be alternately opened or closed to allow hydrogen gas through one or other of gas vitrification chambers 106, 106'. Within said first hydrogen gas purification chamber 106, 106' is a bed of particulate material 110. This bed of particulate material is comprised of nickel in an amount of at least 5% by weight as elemental nickel with an inert material such as alumina or silica and may be supported, for example, on a silicia-based substrate. The nickel, as elemental nickel, is distributed over an effective surface area of at least about 100 $m^2/g$, and typically has a surface area of from 100 to 200 $m^2/g$, as described in more detail in U.S. Pat. No. 4,713,224 whose teachings are incorporated herein by reference. The bed of particulate material 110, at a temperature of from 0° C. to 50° C. removes the at least one first impurity gas. Bid 110 may in addition contain a natural or artificial molecular sieve material 111 to help with the removal of carbon dioxide, or a separate molecular sieve stage may be provided. The bed of particulate material 110 is also capable of removing moisture down to trace levels of about 50 ppb, but not nitrogen.

There is thus produced partially purified hydrogen gas containing only the second impurity gas consisting essentially of nitrogen and traces of moisture. The partially purified hydrogen gas leaves first hydrogen purification chamber 106, 106' to enter a second hydrogen gas purification chamber 112 with which chamber 106, 106' is in fluid communication by means of tubulations 114, 114'. Valves 116, 116' control the flow of partially purified hydrogen gas from two purification chambers 106, 106' are provided to allow for regeneration of the nickel in one chamber whilst the other is functioning. In the second hydrogen gas purification chamber 112 the partially purified hydrogen gas comes into contact with a bed of getter material 118. Getter material 118 may be any getter material capable of removing nitrogen and traces of moisture from nitrogen-containing hydrogen at a temperature of less than 500° C. It should be capable of being activated at these low temperatures and have a high nitrogen sorption capacity. Furthermore it should produce methane at extremely low concentrations when not subject to the sorption of carbon monoxide or carbon dioxide in the presence of hydrogen. It is preferably an alloy of zirconium, vanadium and iron. Alloys useful in the present invention are described in Boffito et al. U.S. Pat. No. 4,312,669.

It should be realized that small amounts of other metals can be used without substantially altering its purification characteristics. For instance the iron or vanadium may be partially replaced by nickel cobalt or manganese, and the vanadium may be partially replaced with niobium. It may be advantageous to replace some of the zirconium with titanium without substantially altering the main sorption ability of the basic ternary alloy. One or more substitutions may take place at the same time.

A suitable alloy is one in which the getter material is a non-evaporable ternary gettering alloy whose composition in weight percent when plotted on a ternary composition diagram lies within a polygon having as its corners the points defined by:

(a) 75% Zr—20% V—5% Fe (b) 45% Zr—20% V—35% Fe (c) 45% Zr—50% V—5% Fe.

A preferred alloy is one in which the getter material is a non-evaporable ternary gettering alloy whose composition in weight percent when plotted on a ternary composition diagram in weight percent Zr, weight percent V and Weight percent Fe lies within a polygon having as its corners the points defined by:

(d) 70% Zr—25% V—5% Fe (e) 70% Zr—24% V—6% Fe (f) 66% Zr—24% V—10% Fe (g) 47% Zr—43% V—10% Fe (h) 47% Zr—45% V—8% Fe (i) 50% Zr—45% V—5% Fe.

Even more preferably it is 70% Zr—24.6% V—5.4% Fe by weight.

From the results obtained the following Table I was constructed

TABLE 1

| EXAMPLE | MATERIAL | FORM | REMOVAL OF CARBON MONOXIDE | FORMATION OF METHANE |
| --- | --- | --- | --- | --- |
| 1 | 70% Zr—24.6% V—5.4% Fe | Pill 3 mm × 4 mm | 100% | 25% |
| 2 | $Zr_2Fe$ | Pill 3 mm × 4 mm | 100% | 35–40% |
| 3 | 84% Zr—16% Al | Powder <200 μm | 100% | 50% |
| 4 | ZrMnFe | Pill 6 mm × 4 mm | 100% | 2–7% |
| 5 | $Zr_{0.2}Ti_{0.8}$—$Mn_{0.5}Fe_{1.5}$ | Powder <200 μm | 100% | 1–2% |
| 6 | BaCu | Granules <1.4 mm | 0% | 0% |
| 7 | Engelhard Ni0104T | Pill 3 mm × 4 mm | 100% | 0% |

The getter material is preferably in the form of a powder preferably having a powder size between 1 μm and 500 μm and more preferably between 5 μm and 250 μm. Then the powder is compressed into a porous pellet shape which may be, for instance, 4 mm in diameter and 3 mm in height.

In addition all metal surfaces of the apparatus that contact the purified gas should to have a densely and smoothly polished surface to minimize contamination. The smoothness numerically defined to be such that the roughness of the inner wall surface to contact the gas is 0.5 μm or less, preferably 0.25 μm or less in terms of the centerline average height ($R_a$). This numerical range is not always critical but is recommended as a dependable, safe range.

The invention may be better understood by reference to the following examples wherein all parts and percentages are by weight unless otherwise indicated. These examples are designed to teach those skilled in the art how to practice the present invention and represent the best mode presently known mode for practising the invention.

EXAMPLES 1–7

A chamber fitted with an inlet and an outlet was filled with 50 g of the material to be tested for the removal of carbon monoxide (and by inference carbon dioxide) from hydrogen gas, at a pressure of greater than 1 bar, and the production of methane. Before the tests commenced all materials were activated at 400° C. in a flow of Research Grade hydrogen, obtained from SIAD, Bergamo, Italy, of 200 cm³ per minute for 4 hours, with the exception of the tests of Examples 6 and 7 where temperatures of 350° C. and 200° C. respectively were used.

The materials were then cooled to room temperature and then a test gas of hydrogen containing 5 ppm by volume of carbon monoxide, and less than 5 ppb of methane obtained from SIAD, was allowed to flow at a rate of 500 cm³ per minute and the carbon monoxide and methane were measured at the outlet. The impurity levels of the two gases were measured with a VALCO gas chromatograph filled with a metastable helium ionization detector with a measurement sensitivity limit of 30 ppb for carbon monoxide and 5 ppb for methane.

The percent formation of methane is regarded as the ppm of methane formed expressed as a percentage of the carbon monoxide removed. One example of a material which removes material which removed 100% of carbon monoxide from hydrogen with no formation of methane is the Engelhard Ni0104T of Example 7, obtained from Engelhard, Menlo Park, Calif.

This is particularly surprising as U.S. Pat. No. 4,713,224 teaches that the nickel-based particulate material can be used to remove hydrogen from inert gas (including nitrogen) streams. This unexpected finding can be used to produce a hydrogen gas with an impurity gas consisting essentially of nitrogen.

EXAMPLE 8

This example was designed to show the production of methane by a 70% Zr—24.6% V—5.4% Fe getter material when subject to the sorption of pure hydrogen, at a pressure of greater than 1 bar, not accompanied by sorption of carbon monoxide.

A chamber fitted with an inlet and an outlet was filled with 50 g of the getter material to be tested for the production of methane when subject to the sorption of pure hydrogen.

A flow of pure hydrogen with a maximum content of methane of less than 5 ppb and a maximum content of carbon dioxide of less than 5 ppb, obtained from SIAD was allowed to flow at a rate of 0.1 liter/min through the inlet into the chamber. The sample of getter material was heated to 400° C. and the methane produced by the getter was measured at the outlet with a VALCO gas chromatograph fitted with a metastable helium ionization detector with a measurement sensitivity for methane of 5 ppb The results are reported in the graph of FIG. 2 as curve 1.

EXAMPLE 9

The test of Example 8 was repeated with all conditions the same except that the getter material used was ZrMnFe. The results are reported on the graph of FIG. 2 as curve 2.

EXAMPLE 10

The test of Example 8 was repeated with all conditions the same except that the getter material used was $Zr_{0.2}Ti_{0.8}Mn_{0.5}Fe_{1.5}$.

Figure 2:
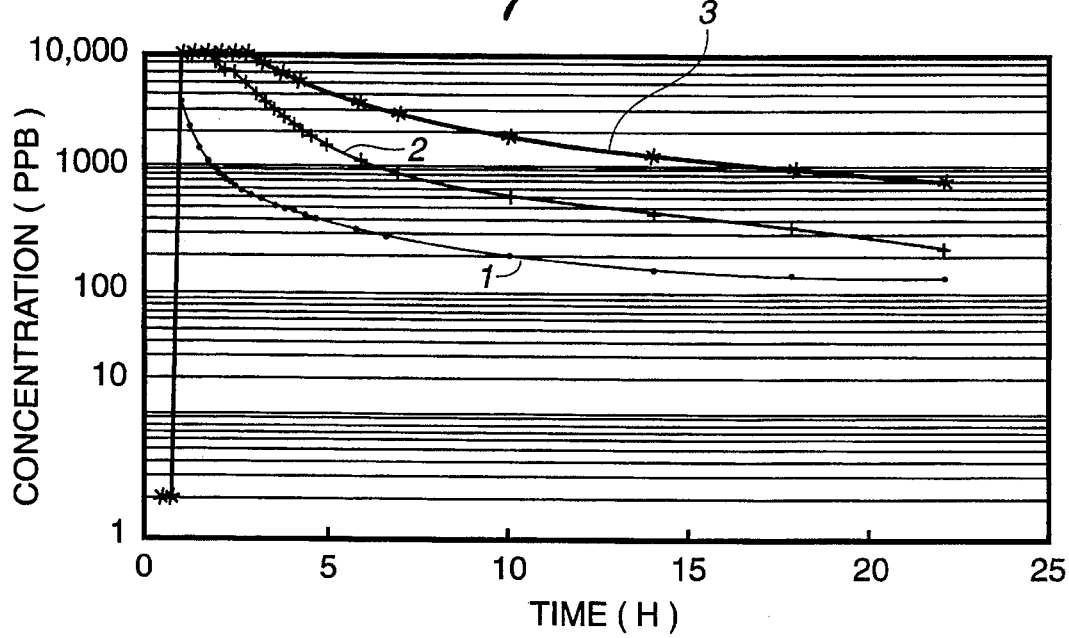
FIG. 2 is a graph showing on the ordinate the amount of methane produced by different getter materials, in pure hydrogen, as a function of time on the abscissa.

The results are reported on graphs of FIG. 2 as curve 3.

EXAMPLE 11

The test of Example 8 was repeated with all conditions the same except that the test gas was made to flow at various rates.

Figure 3:
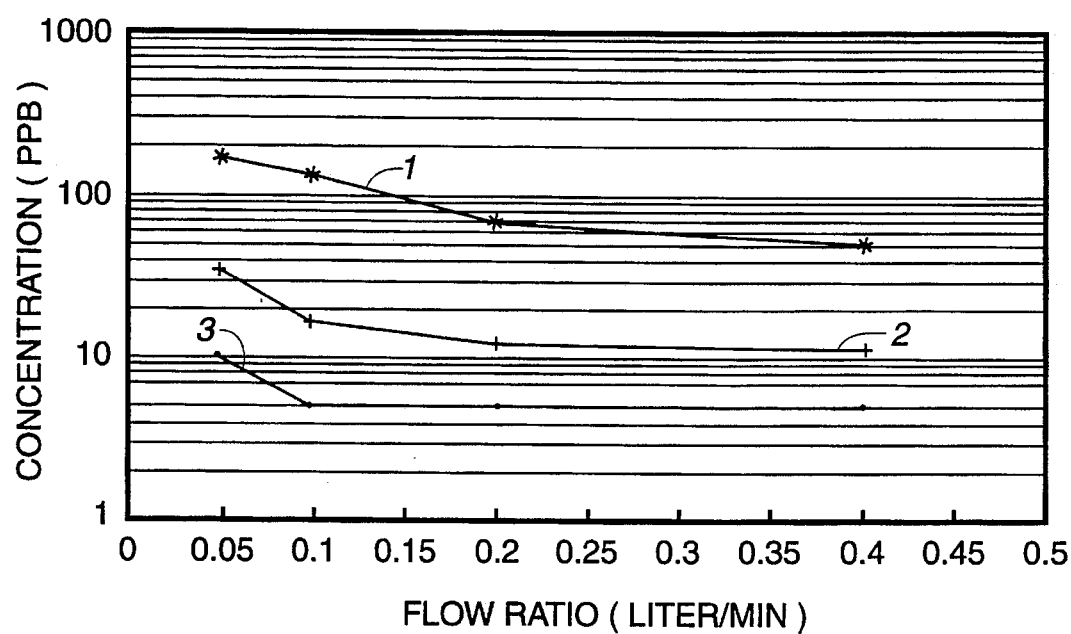
FIG. 3 is a graph showing on the ordinate the amount of methane produced by a 70% Zr—24.6% V—5.4% Fe alloy at different temperatures as a function of gas flow rate in liter per minute on the abscissa.

The results are reported on the graphs of FIG. 3 as curve 1.

EXAMPLE 12

The test of Example 11 was repeated with all conditions the same except that the temperature was reduced to 350° C.

The results are reported on the graphs of FIG. 3 as curve 2.

The test of Example 11 was repeated with all conditions the same except that the temperature was reduced to 300° C.

The results are reported on the graphs of FIG. 3 as curve 3.

EXAMPLE 14

A chamber fitted with an inlet and an outlet was filled with 50 g of 70% Zr—24.6% V—5.4% Fe, and activated at 400° C. for 4 hours in a flow of 200 cm³/min of Research Grade hydrogen from SIAD.

The temperature was reduced to 350° C. and a test gas of hydrogen containing 50 ppm of nitrogen, obtained from SIAD was allowed to flow at a rate of 200 cm²/min.

The test was continued until at least 8 liter torr/g of nitrogen had been sorbed. No nitrogen was detected at the outlet as measured on an ANTEK gaschromatograph provided with a metastable helium ionization detector with a nitrogen sensitivity of 30 ppb.

EXAMPLE 15

The test of Example 14 was repeated with all conditions the same except that the temperature was reduced to 300° C.

The test was continued until at least 8 liter torr/g of nitrogen had been sorbed. No nitrogen was detected at the outlet as measured on an ANTEK gaschromatograph provided with a metastable helium ionization detector with a nitrogen sensitivity of 30 ppb.

Although from Table 1 it is seen that ZrMnFe alloys produce a high percentage of methane when simultaneously absorbing carbon monoxide in the presence of hydrogen, in comparison with some other getter materials, FIG. 2 shows that on the contrary, methane is produced to a much lower extent than is produced by other getter materials. FIG. 3 shows that between 300° C. and 350° C. the methane produced is less than 20 ppb.

Furthermore at these temperatures Examples 14 and 15 show that the nitrogen sorption capacity is still very high.

Although the invention has been described in considerable detail with reference to certain preferred embodiments designed to teach those skilled in the art how best to practice the invention. It will be realized that other modifications may be employed without departing from the spirit and scope of the appended claims.

We claim:

1. A purifier for the removal of impurities from an impurity-containing hydrogen gas without generating methane, said impurities including carbon monoxide and nitrogen, said purifier comprising:

A. a gas inlet in fluid communication with a first hydrogen gas purification chamber, said first hydrogen gas purification chamber including a bed of particulate material said particulate material including at least 5% elemental nickel by weight, said particulate material being maintained at a temperature between 0° C. and 50° C. to remove said carbon monoxide to produce a partially purified hydrogen gas; and B. a second hydrogen gas purification chamber in fluid communication with said first hydrogen gas purification chamber, said second hydrogen gas purification chamber including a bed of getter material maintained at a temperature between 200° C. and 500° C. to remove nitrogen from said partially purified hydrogen gas to produce a purified hydrogen gas having less than 20 ppb carbon monoxide and nitrogen impurities, said second hydrogen gas purification chamber being in fluid communication with a purified hydrogen gas outlet wherein said first and second hydrogen gas purification chambers are maintained under conditions effective to prevent the production of methane during the purification of said impurity-containing hydrogen gas.

2. The purifier of claim 1 wherein the internal surfaces of said first and second hydrogen purification chambers have been electropolished to produce a surface roughness of no greater than 0.5 μm $R_a$.

3. The purifier of claim 1 in which the getter material is an alloy of zirconium, vanadium and iron.

4. The purifier of claim 3 in which said getter material is a non-evaporable ternary gettering alloy of zirconium, vanadium and iron whose composition, when plotted on a ternary composition diagram as weight percent Zr, weight percent V and weight percent Fe, lies within a polygon whose verticies are defined by the points:

(a) 75% Zr—20% V—5% Fe;
(b) 45% Zr—20% V—35% Fe; and
(c) 45% Zr—50% V—5% Fe.

5. The purifier of claim 4 in which the composition of said ternary alloy lies within a polygon whose vertices are defined by the points:

(d) 70% Zr—25% V—5% Fe;
(e) 70% Zr—24% V—6% Fe;
(f) 66% Zr—24% V—10% Fe;
(g) 47% Zr—43% V—10% Fe;
(h) 47% Zr—45% V—8% Fe; and
(i) 50% Zr—45% V—5% Fe.

6. The purifier of claim 5 in which said getter material is 70% by weight zirconium, 24.6% by weight vanadium and 5.4% by weight iron.

7. The purifier of claim 6 in which said getter material is maintained at a temperature between 300° C. and 350° C.

* * * * *

UNITED STATES PATENT AND TRADEMARK OFFICE
CERTIFICATE OF CORRECTION

PATENT NO. : 5,556,603
DATED : September 17, 1996
INVENTOR(S) : Succi, et al.

It is certified that error appears in the above-indentified patent and that said Letters Patent is hereby corrected as shown below:

Column 1, line 57, change "N" to --No.--.
Column 1, line 58, change "N" to --No.--.
Column 2, line 54, change "Present" to --present--.
Column 3, line 64, change "vitrification" to --purification--.
Column 4, line 9, change "Bid" to --Bed--.

Signed and Sealed this

Eleventh Day of February, 1997

Attest:

BRUCE LEHMAN

Attesting Officer

Commissioner of Patents and Trademarks